United States Patent [19]

Six

[11] 4,333,043

[45] Jun. 1, 1982

[54] ELECTRICAL CONTROL CIRCUIT FOR CONTROLLING A D.C. SOLENOID

[75] Inventor: Rudolph E. Six, Roseville, Mich.

[73] Assignee: Almo Manifold & Tool Co., Center Line, Mich.

[21] Appl. No.: 92,214

[22] Filed: Nov. 7, 1979

Related U.S. Application Data

[63] Continuation of Ser. No. 889,728, Mar. 24, 1978, abandoned.

[51] Int. Cl.³ .............................................. G05B 7/00
[52] U.S. Cl. .................................................. 318/591
[58] Field of Search ....................... 318/590, 591, 635; 364/114, 115

[56] References Cited

U.S. PATENT DOCUMENTS 3,322,994  5/1967  Dever et al. ........................ 364/114
3,549,976  12/1970  De Bretagne ....................... 318/591
3,984,665  10/1976  Shriver et al. ...................... 364/114

*Primary Examiner*—J. V. Truhe
*Assistant Examiner*—Eugene S. Indyk
*Attorney, Agent, or Firm*—William L. Fisher

[57] ABSTRACT

Improvement in an electrical control circuit for controlling a D.C. solenoid having a plunger and a manual control potentiometer, a feedback potentiometer and a comparator for comparing the signal voltages from the potentiometers so that the movement of the plunger of the solenoid is proportional to the movement of the wiper of the manual potentiometer, the feedback potentiometer being controlled by the movement of the plunger of the solenoid, feeding the output signal from the feedback potentiometer to the comparator, the improvement comprising providing a digital computer control for the solenoid alternately with the manual control, the computer control capable of receiving binary digital input signals and converting them to analog variable signal voltages, switching between one or the other of the manual and computer controls so that the output signal from either one thereof is fed to the comparator for comparison with the signal from the feedback potentiometer, isolating in each of the two controls between ground and a fixed D.C. voltage source the respective output signals so that the voltage swings thereof are comparable to each other, setting the wiper arm of the manual potentiometer at a given percentage of its travel while adjusting the input signal to the comparator from the manual control at a predetermined value, adjusting the travel position of the plunger of the solenoid and holding it at the given percentage of its travel when the input signal to the comparator is at the predetermined value, and using the predetermined input signal to the comparator for calibrating the computer control against the manual control.

6 Claims, 1 Drawing Figure

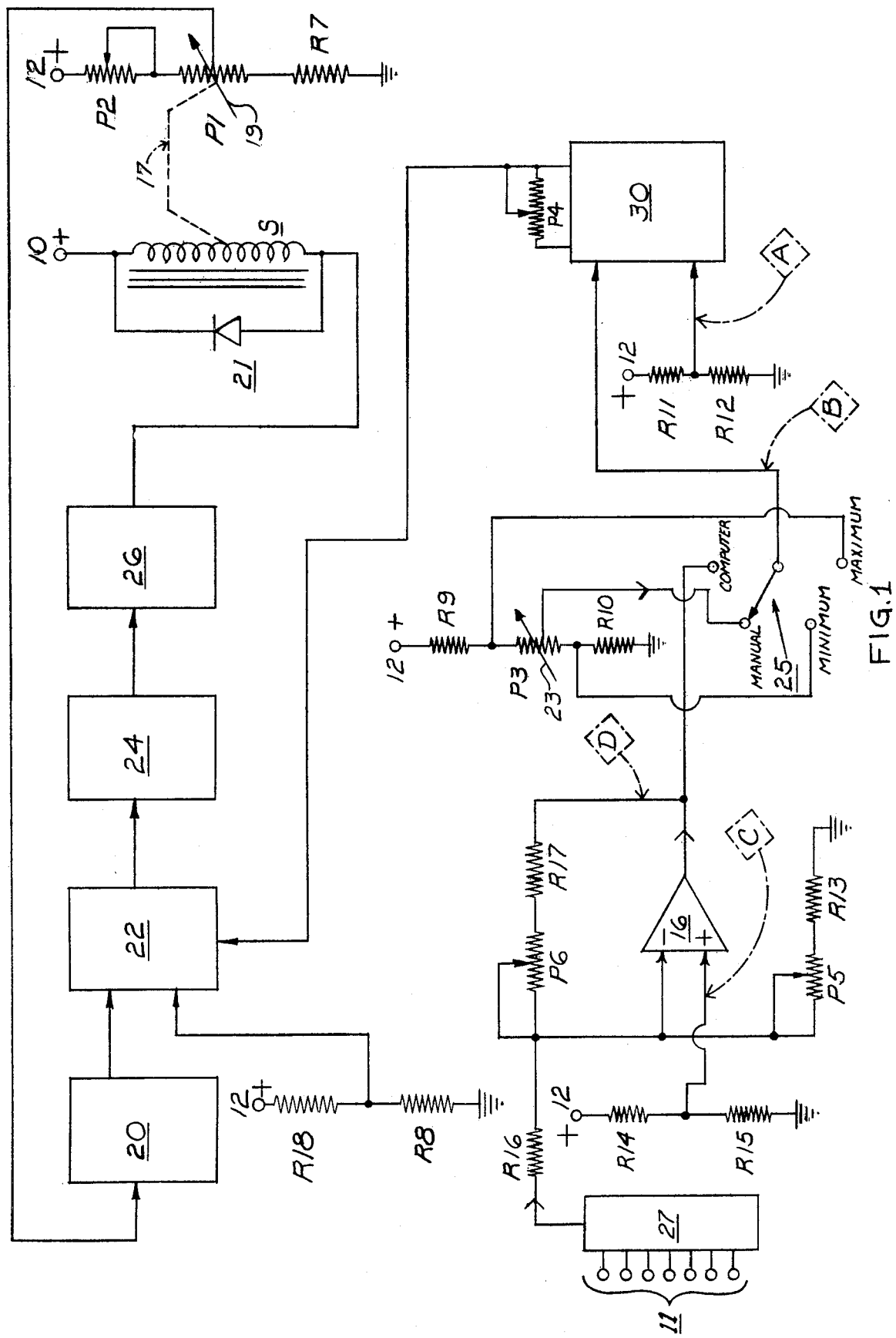

ELECTRICAL CONTROL CIRCUIT FOR CONTROLLING A D.C. SOLENOID

This is a continuation of application Ser. No. 889,728, filed Mar. 24, 1978, and now abandoned.

My invention relates to electrical control circuits.

The principal object of my invention is the provision of improvements in such circuits, particularly for controlling a flow control valve.

The foregoing object of my invention and the advantages thereof will become apparent during the course of the following description, taken in conjunction with the accompanying drawings, in which FIG. 1 is a schematic diagram of an electrical control circuit embodying my invention.

Referring to the drawings in greater detail, S generally designates a solenoid and 10 a D.C. voltage source therefor and for various other components of said circuit as shown. $P_1$ designates a potentiometer associated with said solenoid S and 17 a connection between the plunger of the solenoid S and the wiper arm 19 of said potentiometer $P_1$ so that the two move together. 12 designates another D.C. voltage source to which various resistors and potentiometers are connected between it and ground for providing a plurality of voltage dropping paths as shown. One such voltage dropping path contains said potentiometer $P_1$, a resistor $R_7$ and an adjustment potentiometer $P_2$. The wiper arm 19 sends a feedback signal to the input of a feedback buffer 20 which, in turn, sends its output to a comparator 22. Another input to said comparator 22 is supplied by a manually operated control potentiometer $P_3$ through a reference amplifier 30. At the low range of input signals the reference amplifier 30 operates as a negative gain amplifier so that its output swing is comparable to that from the wiper arm 19. The output of the comparator 22 is fed to a voltage controlled oscillator and pulse width modulator 24 which drives a power buffer 26 which, in turn, pulses the solenoid S with its current requirements. The greater the difference between the signals from the wiper arms 19 and 23, the greater is the output from the comparator 22; if they are the same the comparator 22 produces a minimum output insufficient to drive the solenoid S. A free wheeling diode 21 in parallel with the solenoid S is provided to collapse the field of the solenoid S between pulses. The solenoid S is calibrated by setting the wiper arm 23 of the potentiometer $P_3$ at midrange as determined by a zero reading at test points A and B and then adjusting the potentiometer $P_2$ until the plunger of the solenoid S remains at midpoint. Maximum and minimum travel of the solenoid S is caibrated by setting the wiper arm 23 at either high or low range and adjusting a potentiometer $P_4$ for the reference amplifier 30 until said flow control valve is fully open or closed. The circuit components thus far described for proportionally controlling a flow control valve in a spray bar used in metal rolling are represented in simplified form in a prior copending patent application assigned to the same assignee as the subject invention; i.e. Ser. No. 726,986 filed Sept. 27, 1976, now U.S. Pat. No. 4,081,141 issued Mar. 28, 1978.

In accordance with my present invention, I have provided a unique arrangement for selecting either manual or computer control of the solenoid S which includes another of said voltage dropping paths containing, in addition to said potentiometer $P_3$, resistors $R_9$ and $R_{10}$ above and below said potentiometer $P_3$ so as to isolate the latter from said voltage source 12 and from ground so that the voltage swing thereof is between predetermined minimum and maximum voltages. In the instance, the value of the resistors $R_9$ and $R_{10}$ are equal to each other and to said potentiometer $P_3$ so that the voltage swing of the latter is between one-third and two-thirds of that of said voltage source 12.

I provide a multi-position selector switch 25 for choosing either manual or comparator control of the solenoid S and for making available minimum and maximum voltage signals for conveniently holding said control valve either closed or fully open; the solenoid S being maintained energized in the closed position of said control valve but insufficiently to open the same. By thus isolating the voltage swing of the potentiometer $P_3$ I am able to match a computer control for the solenoid S with the manual control therefor. Said computer control is provided by a digital to analog converter 27 having, in the instance, seven input terminals shown and indicated at 11 for receiving binary input signals. The output of said converter 27 is fed to an operational amplifier 16 having associated therewith resistors $R_{13}$ and $R_{17}$ and adjusting potentiometers $P_5$ and $P_6$ as shown. The output of said amplifier 16 is fed to said reference amplifier 30 through a contact of said selector switch 25. Said computer control is designed so that the voltage output of the amplifier 16 is isolated like that of potentiometer $P_3$ and has a comparable voltage swing. The output of the amplifier 16 is balanced with that of the potentiometer $P_3$ by entering a 50% digital input signal at 11 and then adjusting the potentiometer $P_5$ until a zero reading is obtained at test points C and D; the plunger of the solenoid S will be at midpoint at this time. Maximum and minimum travel of the plunger of the solenoid S is calibrated for computer control by entering either a minimum or 100% digital input signal at 11 and then adjusting the potentiometer $P_6$ until said flow control valve is closed or fully open. Data concerning various components of my electrical control circuit are given in the Table Z below. A single computer can simultaneously control a large number of solenoids using my control circuit; it being understood that my control circuit is required for each such solenoid and valve.

TABLE Z

|  | Ohms |  | Ohms |
|---|---|---|---|
| $P_1$ | 10K | $R_{10}$ | 10K |
| $P_2$ | 2K | $R_{11}$ | 10K |
| $P_3$ | 10K | $R_{12}$ | 10K |
| $P_4$ | 100K | $R_{13}$ | 27K |
| $P_5$ | 10K | $R_{14}$ | 10K |
| $P_6$ | 5K | $R_{15}$ | 10K |
| $R_7$ | 680 | $R_{16}$ | 15K to 960K |
| $R_8$ | 10K | $R_{17}$ | 2.7K |
| $R_9$ | 10K | $R_{18}$ | 10K |

It will thus be seen that there has been provided by my invention improvements in an electrical control circuit for controlling a direct current solenoid in which the object hereinabove set forth, together with many thoroughly practical advantages, has been achieved. While a preferred embodiment of my invention has been shown and described, it is to be understood that variations and changes may be resorted to without departing from the spirit of my invention as defined by the appended claims.

What I claim is:

1. Improvement in an electrical control circuit for controlling a D.C. solenoid having a plunger, a manual control potentiometer, a feedback potentiometer, a comparator for comparing the signal voltages from said potentiometers so that the movement of the plunger of said solenoid is proportional to the movement of the wiper of said manual potentiometer, said feedback potentiometer being controlled by the movement of the plunger of said solenoid, and means for feeding the output signal from said feedback potentiometer to said comparator, said improvement comprising a digital computer control circuit for controlling said solenoid alternately with said manual control, said computer control circuit capable of receiving binary digital input signals and converting them to analog variable signal voltages, switch means for switching between one or the other of said manual and computer controls so that the output signal from either one thereof is fed to said comparator for comparison with the signal from said feedback potentiometer, circuit means in each of the two controls for isolating between ground and a fixed D.C. voltage source the respective output signals so that the respective voltage swings thereof are comparable to each other, means for setting the wiper of the manual potentiometer at a given percentage of its travel while adjusting the input signal to said comparator from said manual control at a predetermined value, means for adjusting the travel position of the plunger of the solenoid and holding it at said given percentage of its travel when the input signal to said comparator is at said predetermined value, and means using said predetermined value of input signal to said comparator for calibrating the computer control against said manual control.

2. Improvement as claimed in claim 1, said means for isolating the signal voltages from the manual potentiometer comprising a voltage dropping path between ground and said fixed D.C. voltage source, said voltage dropping path containing said manual potentiometer and a fixed resistor on each end thereof, said switch means including a multiselector switch having a contact thereof connected to the wiper of said manual potentiometer and another contact thereof connected to the output of said computer control circuit and two further contacts thereof connected to said opposite ends of said manual potentiometer for selectively feeding predetermined minimum and maximum voltages to said comparator to manually hold said solenoid in minimum and maximum operational positions thereof.

3. Improvement as claimed in claim 1, the calibrating means for said manual control circuit utilizing a given percentage signal from the wiper of said manual potentiometer for setting the position of the plunger of said solenoid at the same percentage of its movement, and the calibrating means for said computer control circuit utilizing the pre-set position of said plunger for adjusting the same percentage signal from said computer control circuit.

4. Improvement in method of controlling a D.C. solenoid having a plunger, a manual control potentiometer, a feedback potentiometer, a comparator for comparing the signal voltages from said potentiometers so that the movement of the plunger of said solenoid is proportional to the movement of the wiper of said manual potentiometer, said feedback potentiometer being controlled by the movement of the plunger of said solenoid, and a means for feeding the output signal from said feedback potentiometer to said comparator, said improvement comprising providing a digital computer control for said solenoid alternately with said manual control, said computer control capable of receiving binary digital input signals and converting them to analog variable signal voltages, switching between one or the other of said manual and computer controls so that the output signal from either one thereof is fed to said comparator for comparison with the signal from said feedback potentiometer, isolating in each of the two controls between ground and a fixed D.C. voltage source the respective output signals so that the voltage swings thereof are comparable to each other, setting the wiper arm of the manual potentiometer at a given percentage of its travel while adjusting the input signal to said comparator from said manual control at a predetermined value adjusting the travel position of the plunger of the solenoid and holding it at said given percentage of its travel when the input signal to said comparator is at said predetermined value, and using said predetermined input signal to said comparator for calibrating the computer control against the manual control.

5. Improvement as claimed in claim 4, said isolating of the signal voltages from the manual potentiometer consisting of dropping voltages along a voltage dropping path between ground and said fixed D.C. voltage source, said dropping of voltages including dropping voltages on each end of said manual potentiometer providing a first electrical contact connected to the wiper of said manual potentiometer and another electrical contact connected to the output of said computer control circuit, and two further electrical contacts connected to opposite ends of said manual potentiometer for selectively feeding predetermined maximum and minimum voltages to said comparator to manually hold said solenoid in minimum and maximum operational positions thereof.

6. Improvement as claimed in claim 4, said calibrating for said manual control circuit utilizing a given percentage signal from the wiper of said manual potentiometer for setting the position of the plunger of said solenoid at the same percentage of its movement, and said calibrating for said computer control circuit utilizing said preset position of said plunger for adjusting the same percentage signal from said computer control circuit.

* * * * *